United States Patent [19]
Webster

[11] Patent Number: 5,965,261
[45] Date of Patent: Oct. 12, 1999

[54] POLYESTER

[75] Inventor: Joseph R. Webster, Charlotte, N.C.

[73] Assignee: Clariant Finance (BVI) Limited, Tortola, Virgin Islands (Br.)

[21] Appl. No.: 09/192,608

[22] Filed: Nov. 16, 1998

[51] Int. Cl.$^6$ .................................................. D02G 3/00
[52] U.S. Cl. .................... 428/364; 528/289; 528/308.6; 525/437; 525/440; 525/443; 524/81
[58] Field of Search ................................ 528/289, 308.6; 525/437, 440, 443; 524/81; 428/364

[56] References Cited

U.S. PATENT DOCUMENTS

| | | | |
|---|---|---|---|
| 3,907,926 | 9/1975 | Brown et al. ............................ | 524/258 |
| 4,136,090 | 1/1979 | Hoeschele ............................... | 524/718 |
| 4,185,003 | 1/1980 | Hoeschele ............................... | 524/102 |
| 4,340,718 | 7/1982 | Zannucci et al. ....................... | 528/128 |
| 4,355,155 | 10/1982 | Nelsen .................................... | 528/301 |
| 4,405,749 | 9/1983 | Nelsen .................................... | 524/100 |
| 4,469,851 | 9/1984 | Charles et al. ......................... | 525/444 |
| 4,524,165 | 6/1985 | Musser et al. .......................... | 524/99 |

*Primary Examiner*—Samuel A. Acquah
*Attorney, Agent, or Firm*—Miles B. Dearth; Susan S. Jackson

[57] ABSTRACT

The disclosure pertains to an intimate molecular mixture of polyester with an effective amount of compound (A)

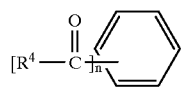

(A)

where n=2 and at least one $R^4$ group represents a sterically hindered amine group adjacent to the carbonyl, and preferably each $R^4$ group is a hindered amino group.

Exemplary $R^4$ groups are according to formulae

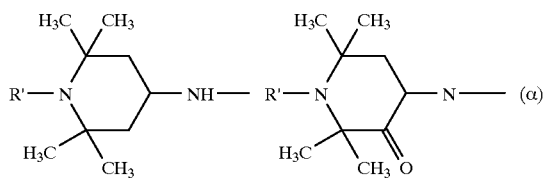

7 Claims, 1 Drawing Sheet

POLYESTER

This invention relates to novel polyester articles, such as film, fibers and moldings, a process for improving the unaged and aged physical properties of polyester obtained after melt processing and aging. In the practice of the invention improvements in processing (heat) stability, light stability, chemical stability and dyeability of polyester is achieved. The long-term stability of colorants in dyed or pigmented polyesters is also improved.

Polyesters are in general worked, in particular during spinning processes, at temperatures of the order of 270° C. or above. At these temperatures degradation of the polymer is ongoing and results in loss of initial and long-term physical properties. Loss of physical properties is problematic particularly from the standpoint of spinning of synthetic polyester. The through-put of polyester spinning processes is disrupted such that the polymer is exposed to the high temperatures of the spinning apparatus for longer periods than would be expected under normal running of the apparatus. Polyester must be stabilized for light stability, in addition due to the susceptibility to oxidation, thermal-aging and oxidative chemical stability.

WIPO publication WO 97/43335 discloses a stabilizer for polyamide having the structure:

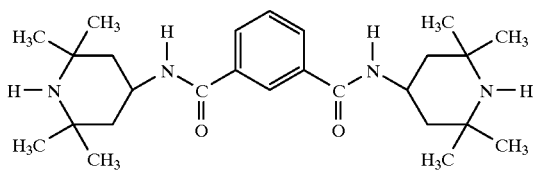

Various stabilization means for polyester are known. In U.S. Pat. No. 4,136,090, for example, thermoplastic copolyetherester elastomers are stabilized against heat and light aging by incorporating into the copolyetherester polymer an effective concentration of a phenolic antioxidant and a copolyester containing a hindered amine moiety having the structure:

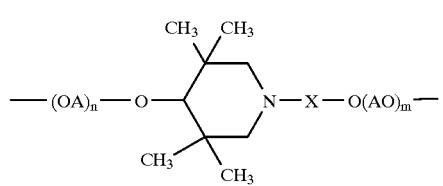

wherein A is ethylene and or propylene, X is a divalent hydrocarbon radical of 2 to 18 carbons and (n+m) equals 5 to 40 and wherein (I) is connected to ester units in the copolyetherester.

Japanese Patent Publication No. 75/91652 discloses the use of a number of hindered piperidine type photostabilizers in combination with phenolic antioxidants in copolyetheresters. However, it has been previously noted, according to U.S. Pat. No. 4,185,003, that when the teaching of this Japanese Publication is followed, photostabilization is improved, however heat-aging behavior is worsened (see, column 1, lines 30–45 of U.S. Pat. No. 4,185,003). The improvement taught in U.S. Pat. No. 4,185,003 is the combination with the copolyester with phenolic antioxidant and hindered amine having the structure:

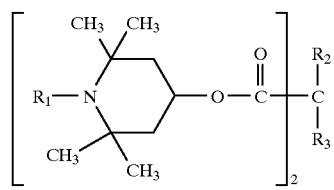

where R is hydrogen or an alkyl radical of 1–12, preferably 1–4 carbon atoms and $R_2$ and $R_3$ represent an alkyl radical hydrocarbons.

In U.S. Pat. No. 4,340,718, polyester materials, particularly copolyesters, are rendered less susceptible to weathering by incorporating into the polyester resin a dimethyl and diethyl ester of p-methoxybenzylidenemalonic acid having monofunctional terminal ester forming groups or a difunctional comonomer.

U.S. Pat. Nos. 4,355,155 and 4,405,749 each disclose segmented thermoplastic copolyester elastomers which may be stabilized against heat. For example, in U.S. Pat. No. 4,355,155 such stabilizers may include phenols and their derivatives, amines and their derivatives, compounds containing both hydroxyl and amine groups, hydroxyazines, oximes, polymeric phenolic esters and salts of multivalent metals in which the metal is in its lower state (see column 3, lines 46–52), while in U.S. Pat. No. 4,405,749, a particular triazine-based anti-oxidant (i.e., 3,5-di-tert-butyl-4-hydroxyhydrocinnamic acid triester with 1,3,5-tris-(2-hydroxyethyl)-s-triazine-2,4,6-(1H, 3H, 5H) trione) is disclosed as having superior thermal stability.

Each of the compositions of the above prior issued U.S. patents moreover mention that additional stabilization against ultraviolet light may be obtained by compounding the copolyetheresters with various UV absorbers, such as substituted benzophenones or benzotriazoles (see, column 4, lines 1–3 of U.S. Pat. No. 4,355,155; and column 4, lines 10–13 of U.S. Pat. No. 4,405,749). U.S. Pat. No. 4,524,165 discloses a combination of certain copolyesterether with at least one hindered phenolic antioxidant, at least one ultraviolet light stabilizer compound which is compatible with the specific copolyesterether, and at least one hindered amine having the formulas:

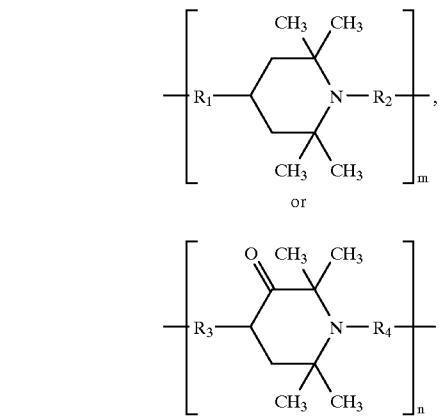

wherein m and n are integers from 1 to 20, $R_{1-4}$ are each independently selected from hydrogen, substituted or unsubstituted alkyl, aryl, alkylene, cycloalkylene, hydroxyalkylene, and esters of hydroxyalkylene, and alkylenecarboxylic acid and esters, amides and metal salts of said alkylenecarboxylic acid. The ultraviolet light stabilizers suggested include monomeric benzotriazoles and monomeric benzophenones. The particular copolyetheresters having superior weathering ability are derived from 1,4-cyclohexanedicarboxylic acid and 1,4-cyclohexanedimethanol, a polyalkylene ether glycol, as compared to terephthalate-based polyesters. In weathering exposure comparisons of stabilized inventive copolyesterethers versus the terephthalic acid types containing the same stabilizer combinations, the terephthalate types performed significantly worse (rapid aging) than the polyesterethers derived from 1,4-cyclohexane dicarboxylic acid and 1,4-cyclohexane dimethanol.

It would be desirable to provide terephthalate-based polyester which exhibit improved initial and aged retention of physical properties, as these types of polyesters are more abundant and economical.

Blends of polybutylene terephthalate and a segmented thermoplastic copolyester elastomer are stabilized against heat or ultraviolet light in known manner via the addition of various stabilizers. For example, in U.S. Pat. No. 3,907,926, antioxidants and amide stabilizers may be incorporated into the PBT/polyester elastomer blends (see column 6, line 55 bridging column 7, line 25), while U.S. Pat. No. 4,469,851 suggests the phenol derivatives (including 3,5-di-tert-butyl-4-hydroxyhydrocinnamic acid triester with 1,3,5-tris-(2-hydroxyethyl)-s-triazine-2,4,6-(1H, 3 H, 5H) trione) may be incorporated into the PBT/polyester elastomer blends for UV-light stabilization functions.

Two considerations are needed to understand sources of failure in phthalate-based polyesters which are exposed to heat and light. Firstly, the heat stabilizing ability during processing of the fiber and UV resistance under long term UV exposure, and secondly the resistance to heat setting treatments to provide bonding of multifilament yarns to structural warp and/or weft fibers. In aging studies retention of fiber strength and elongation properties is critical for heat-set elastomeric phthalate-based fibers. The redistribution and/or deactivation has significant effects on long term retention of tensile strength and elongation after long-term exposures to UV irradiation. Specifically, conventional stabilized terephthalate-based polyester after heat setting can exhibit up to 50% loss in tensile strength and elongation properties after exposure simulating automotive fabrics, that is after 451 kilojoules per square meter of irradiation under standard test SAE J-1885.

It would be of commercial importance to obtain durable phthalate-based polyester, suitable for automotive fabrics, and carpet, which have improved aging retention of physical properties after heat setting, and improved long term retention of physical properties and color after exposure to UV irradiation.

SUMMARY OF THE INVENTION

It is the object of the present invention to provide improvements for polyesters to overcome the above-mentioned short-comings. This object is achieved by the incorporation into polyester as an intimate mixture of a compound according to:

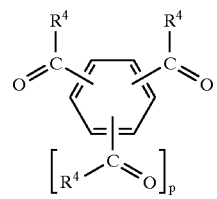

wherein $R^4$ is defined below, p is 0 or 1.

Where p=0, the invention pertains to an intimate molecular mixture of polyester with an effective amount of compound (A)

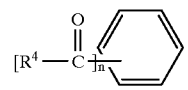

(A)

where n=2 and at least one $R^4$ group represents a sterically hindered amine group adjacent to the carbonyl, and preferably each $R^4$ group is a hindered amino group.

Exemplary, and preferred $R^4$ groups are selected from the group consisting of formulae (α)

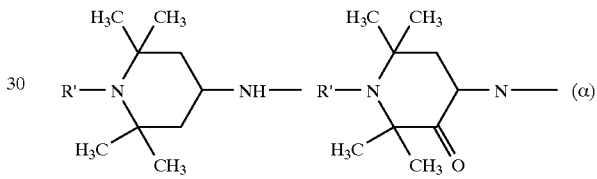

(α)

wherein for either α structure, R' is hydrogen, $C_{1-6}$alkyl, $C_{1-4}$alkoxy or —CO—$C_{1-4}$alkyl, and n is 2 or 3 or 4.

Exemplary members of the class of compounds according to (A) include compounds of the formulae (1), (2), (3), and (4).

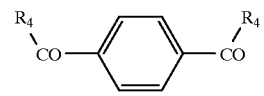

(1)

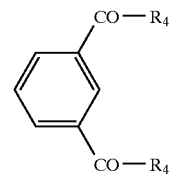

(2)

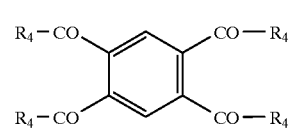

(3)

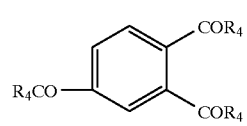

(4)

The invention provides in another one of its aspects a process to modify polyester comprising incorporating therein a masterbatch composition comprising generally 10 to 80% by weight, preferably 5 to 25% by weight, more preferably 15 to 40% by weight of the compound of formula (A) and 90 to 20% by weight, preferably 95 to 50% by weight, more preferably 85 to 60% by weight of a thermoplastic polyester carrier polymer or a carrier polymer which is miscible, or compatible with the polyester.

The modified polyester according to the invention exhibited unexpected improved physical properties and enhanced dye affinity as evidenced by stronger dye retention by the intimate mixture of an effective amount of (A) is made prior to dyeing.

The invention provides in another one of its aspects a method of improving the coloring of synthetic polyesters in the mass by mixing together a synthetic polyester, a suitable dyestuff, such as disperse blue, cationic dyes and acid dyes, or known pigments along with the compound according to formula (A) as defined above.

DESCRIPTION OF THE PREFERRED EMBODIMENTS

Figure 1:
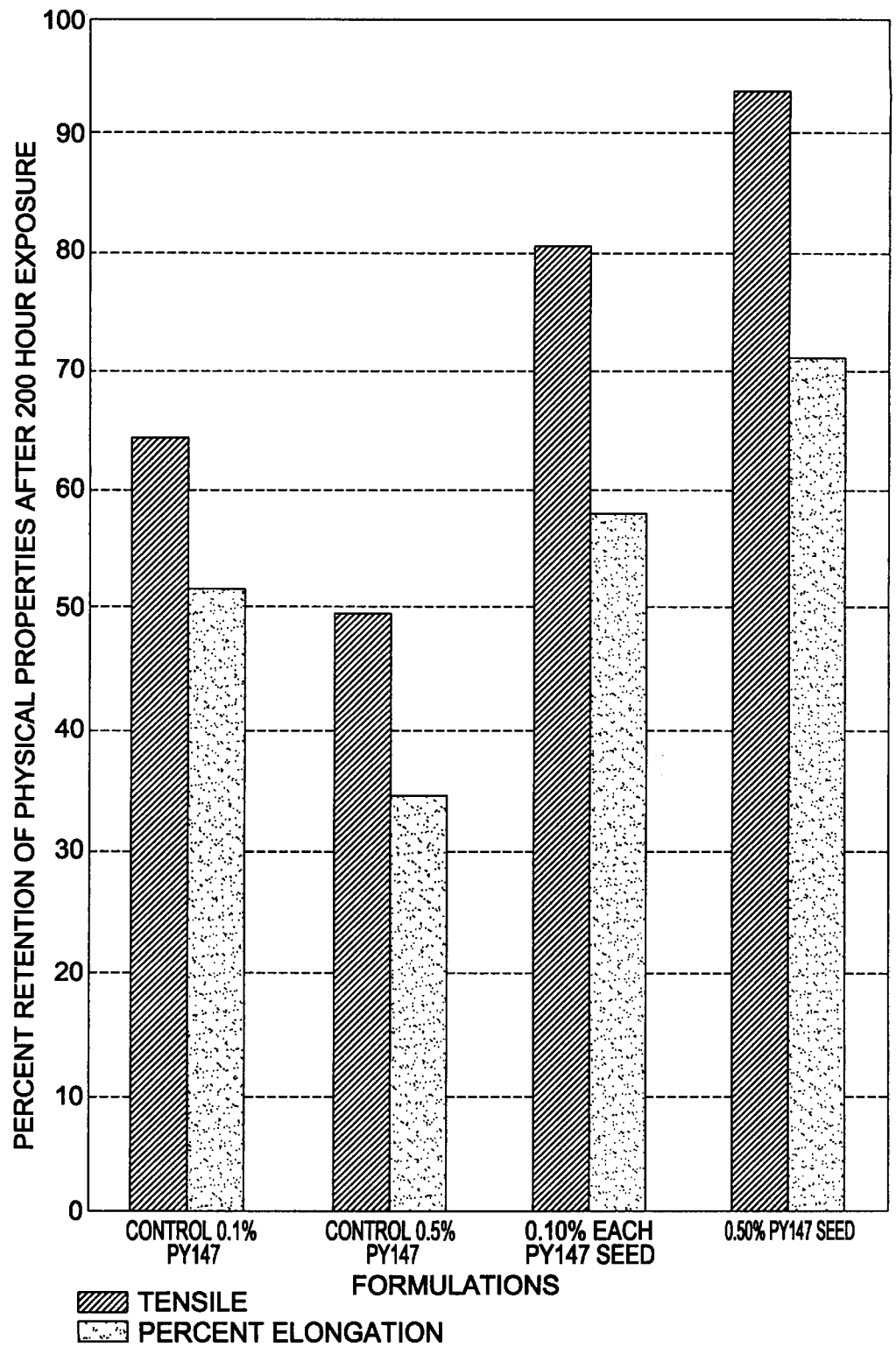
FIG. 1 is a graphical representation of percent retention of tensile strength and elongation after 200 hours Zenon UV exposure for four polyester yarns according to the formulations listed.

The synthetic polyester polymers are well known in the art and commercially available world-wide. The polyester can be a homopolyester, a copolyester, a mixture or blend of polyesters or of a polyester blend with another polymer other than polyester. Typical manufacturing is via direct esterification of a dicarboxylic acid such as terephthalic acid (TA) with a glycol such as ethylene glycol (EG) (primary esterification to an average DP of 2 to 3) followed by a melt or solid stage polymerization to a DP which is commercially usable (70 DP and higher). The phthalate-based polyesters are linear and cyclic polyalkylene terephthalates, particularly polyethylene terephthalate (PET), polypropylene terephthalate (PPT), polybutylene terephthalate (PBT), ethylene-1,4-cyclohexylene-dimethylene terephthalate (PETG), polytrimethylene terephthalate (PTT), polyamide-block-PET, and other versions, e.g., random or block copolymers thereof containing one or more of the above components. Copolyesters are generally copolymers containing soft segments, e.g., polybutylene terephthalate (PBT) and hard segments, e.g., polytetramethylene ether glycol terephthalate. Phthalate-based polyester and co-polyesters are commercially available from duPont De Nemours, Inc. and Trevira® in the U.S. under the Hytrel® and Riteflex® trademarks. Copolyesters can be prepared by polymerizing (a) one or more aromatic dicarboxylic acids or their equivalents (and esters or ester-forming derivatives such as acid chlorides, anhydrides, etc.), (b) one or more linear long chain glycols, and (c) one or more low molecular weight diols. Examples of suitable dicarboxylic acids include but are not limited to isophthalic acid, naphthalene dicarboxylic acid, 4,4'-biphenyldicarboxylic acid, adipic acid. "Diol " as used herein refers to monomers having at least two hydroxy groups. Examples of suitable diols include but are not limited to ethylene glycol, bisphenol A, butanediol, propanediol, neopentyl glycol, cyclohexyldimethanol, hydroquinone, and biphenol. Preferably terephthalic acid-based polyester (referred to as PET) is used in the present invention.

Exemplary copolyesters are copolymers of polybutylene terephthalate and polytetramethylene glycol; block copolymer of polybutylene terephthalate/polybutylene isophthalate and polyethylene glycol/polypropylene glycol, a block copolymer of polybutylene terephthalate/polyhexene terephthalate and polytetramethylene glycol, and a block copolymer of polyurethane and polytetramethylene glycol.

Articles of manufacture of commercial importance in the practice of the invention are the polyester fibers. Included are the conjugate fibers referred to as core-sheath fibers, such as polyolefin-polyester conjugate fibers, Synthetic polyesters modified according to the invention are preferably dyed or pigmented, for example by topical application as in a dye bath or by incorporation of dye in the melt in accordance with conventional methodology. Any type of dyestuff or pigment is suitable for incorporation in the melt, provided that it is stable at the high temperatures encountered in the melt. Preferred dyestuffs are monoazo complexes, in particular, the chromium complexes that are sufficiently stable at the high working temperatures encountered in, e.g. a spinning process. Preferred reactive dyestuffs are those halogen-containing triazinyl or vinyl group-containing metallized azo dyestuffs, in particular, those metallized with chromium, nickel or copper. Preferred pigments to name a few are, for example Pigment Yellow 192, Pigment Orange 68 and Pigment Red 149. Preferred polymer soluble dyes are for example Solvent Red 179.

The preparation of modified synthetic polyesters according to the invention can be dyed in mass by mixing an effective amount of compound (A) with molten polyester, e.g. in an extruder prior to spinning, or before or during the polycondensation process of the synthetic polyester itself.

COMPOUND (A)

The aromatic di- or tri-carbonyl compound intimately mixed with polyester, or precursor monomomers or oligomers of polyester is a monomeric, nonpolymerized, aromatic amide or aromatic ester-amide (aromatic (ester)amide) containing at least one hindered amine group adjacent to carbonyl carbons. The structure is most generally given by:

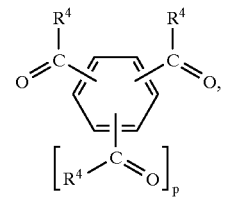

where p 0 or 1, and $R_1$ and $R^2$ is defined as for (A) and (B) below.

When p is 0, the aromatic di-carbonyl (ester)amide is (A) and (B),

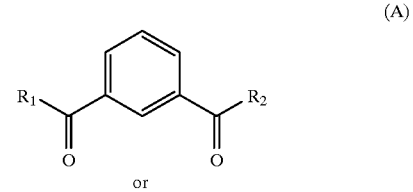

or

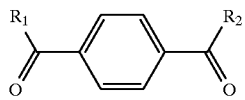

(B)

wherein at least one of $R_1$ and $R_2$ are independently, identical or different sterically hindered amino groups adjacent to the carbonyl group. Preferably both $R_1$ and $R_2$ are hindered amino groups. Where one of $R_1$ and $R_2$ are not hindered amino groups such group can be a alkamino which may optionally be substituted by halogen, hydroxy, carboxyl groups, carbamyl groups or $C_1$–$C_{12}$ alkoxycarbonyl groups, or a $C_3$–$C_5$ alkenyloxy, unsubstituted benzyloxy or benzyloxy which is substituted by halogen or $C_1$–$C_5$alkyl, aliphatic acyloxy containing up to 18 carbon atoms, unsubstituted benzoyloxy or benzoyloxy which is substituted by halogen or $C_1$–$C_4$alkyl, $C_{1-20}$ alkyl, $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N-$C_{1-20}$-alkyl groups, $C_7$–$C_9$ phenylalkyl unsubstituted or mono-, di- or tri-substituted on the phenyl by $C_1$–$C_4$alkyl; or aliphatic or aromatic $C_1$–$C_{10}$acyl.

A preferred aromatic dicarbonyl compound is (B'):

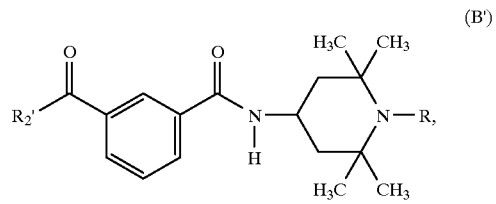

(B')

wherein $R_2'$ is independently $C_{1-20}$ alkyl, $C_{1-20}$ alkylamino, optionally further substituted $C_{1-20}$ alkoxyalkyl, $C_{1-20}$ hydroxyalkyl, $C_{1-20}$ alkenyl, substituted $C_{1-20}$ alkenyl groups, $C_{1-20}$-alkoxy-$C_{1-20}$-alkyl groups, $C_{1-20}$-oxy-N-$C_{1-20}$-alkyl groups, —N-cyclic-$C_{1-10}$-alkyl groups, and cyclic—N—$C_{1-10}$-alkyl groups —$COR_4$, where $R_4$ is hydrogen, $C_{1-6}$alkyl, phenyl, —$C_{1-20}$ COO(H or $C_{1-4}$alkyl).

More preferred is the aromatic dicarbonyl compound (B''):

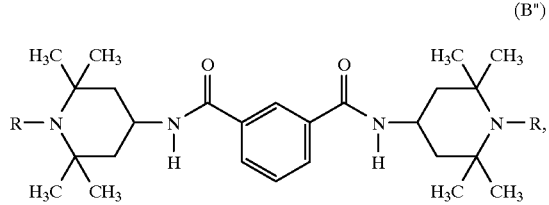

(B'')

wherein each R in B' and B'' is independently either hydrogen, $C_1$–$C_{18}$ alkyl, O, OH, $CH_2CN$, $C_1$–$C_{18}$alkoxy, alkoxyalkylenoxyalky, $C_5$–$C_{12}$cycloalkoxy, $C_3$–$C_6$alkenyl, $C_7$–$C_9$ phenylalkyl unsubstituted or mono-, di- or tri-substituted on the phenyl by $C_1$–$C_4$alkyl; or aliphatic or aromatic $C_1$–$C_{10}$ acyl, or —$COR_4$, where $R_4$ is defined as above.

Examples of alkyl groups having not more than 20 carbon atoms are methyl, ethyl, propyl, isopropyl, butyl, 2-butyl, isobutyl, t-butyl, pentyl, 2-pentyl, hexyl, heptyl, octyl, 2-ethylhexyl, t-octyl, nonyl, decyl, undecyl, dodecyl, tridecyl, tetradecyl, hexadecyl and octadecyl; exemplary branched alkyl groups are isopropyl, isobutyl, t-butyl, 2,2-dimethylpropyl, 2-methylpropyl, cyclohexylmethyl, cyclohexylethyl, 2-ethylhexyl, 3,5,5-trimethylhexyl, 2-hexylundecyl, and 5,7,7-trimethyl-2-(1,3,3-trimethylbutyl)hexyl; exemplary cyclic alkyl groups are cyclohexyl.

Examples of alkoxy(alkyl) groups are methoxy, ethoxy, propoxy, isopropoxy, butoxy, isobutoxy, pentoxy, isopentoxy, hexoxy, 2-ethylhexyloxy, heptoxy, octoxy, decyloxy, dodecyloxy, tetradecyloxy, hexadecyloxy and octadecyloxy, nonadecyloxy. Preferred alkoxy examples are $C_6$–$C_{12}$alkoxy, in particular heptoxy and octoxy.

Examples of the alkoxyalkylenoxyalkyl groups are $C_{1-20}$-alkoxy-$C_{1-5}$-alkylenoxy-$C_{1-20}$-alkyl groups. The $C_{1-20}$-alkoxy groups and $C_{1-20}$-alkyl groups include those mentioned as examples of the alkoxyalkyl groups. Examples of the $C_{1-5}$-alkylenoxy groups include —$CH_2O$—, —$CH_2CH_2O$—, —$CH_2CH_2CH_2O$—,

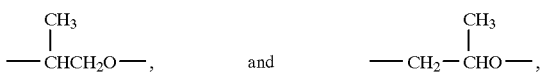

Particularly, $C_{1-2}$-alkoxy-$C_{1-5}$-alkylenoxy-$C_{1-12}$-alkyl groups are more preferred.

Examples of $C_5$–$C_{12}$cycloalkyl $R_3$ unsubstituted or mono-, di- or tri-substituted by $C_1$–$C_4$alkyl are cyclopentyl, methylcyclopentyl, dimethylcyclopentyl, cyclohexyl, methylcyclohexyl, dimethylcyclohexyl, trimethylcyclohexyl, t-butylcyclohexyl, cyclooctyl, cyclodecyl and cyclododecyl. Unsubstituted or substituted cyclohexyl is preferred.

Examples of $C_5$–$C_{12}$cycloalkoxy $R_1$ are cyclopentoxy, cyclohexoxy, cycloheptoxy, cyclooctoxy, cyclodecyloxy and cyclododecyloxy, including as applied to $R_3$. Cyclopentoxy and cyclohexoxy are preferred.

Examples of $C_3$–$C_6$ alkenyl are allyl, 2-methylallyl, butenyl and hexenyl, 3-butenyl, and 10-undecenyl; examples of branched alkenyl groups are 1-methyl-2-propenyl, 3-methyl-3-butenyl. Allyl is preferred.

Examples of $C_7$–$C_9$ phenylalkyl unsubstituted or mono-, di- or tri-substituted on the phenyl by $C_1$–$C_4$alkyl are benzyl, methylbenzyl, dimethylbenzyl, trimethylbenzyl, t-butylbenzyl and 2-phenylethyl. Benzyl is preferred.

Examples of aliphatic and aromatic $C_1$–$C_{10}$ acyl are $C_1$–$C_8$alkanoyl or $C_3$–$C_8$-alkenoyl, for example, acetyl, propionyl, butyryl, isobutyryl, pentanoyl, benzoyl, hexanoyl, heptanoyl, octanoyl, 2-ethylhexanoyl, acryloyl and crotonyl. Acetyl is preferred.

When more than one hindered amine group is present they can be identical or different, and preferably are identical hindered amine groups.

Exemplary aromatic tri-carbonyl compounds are the following C and C',

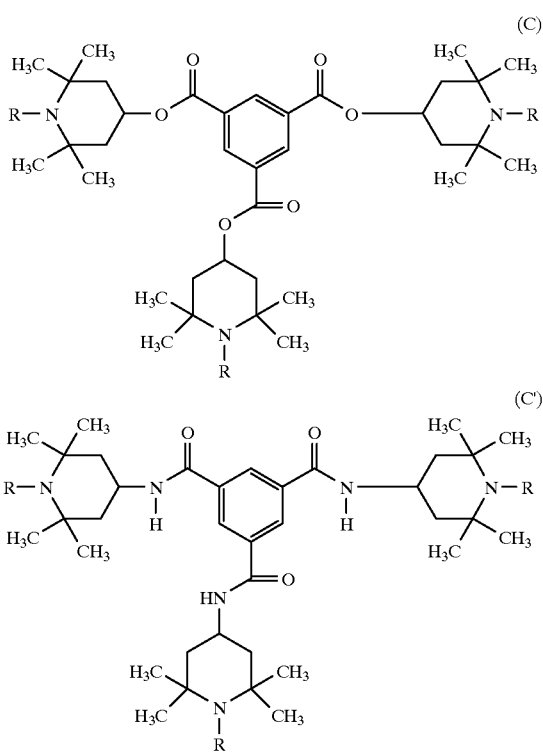

wherein R is defined as in B"

The most preferred aromatic (ester) amide is an aromatic di-amide having the following structure:

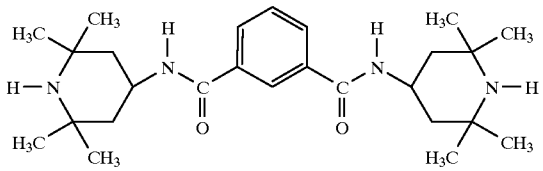

and is commercially available under the S-EED™ designation from Clariant.

The aromatic di- or tri-carbonyl ester amide compounds can be prepared by known means, for example, by the reaction of an aromatic di- or tri-carboxylic acid di- or tri-chloride with 2,2,6,6-tetramethyl-4-amino-piperidine. As one example 1,3,5-tri-(2',2',6',6'-tetramethylpiperidyl-4')-trimesic acid amide is prepared by reaction as follows:

42 grams of trimesic acid are heated for 5 hours at 80° C. with 144.0 ml of thionyl chloride in the presence of catalytic quantities (3 ml) of dimethylformamide and then the excess thionyl chloride is distilled off. The trimesic acid trichloride thus formed is dissolved in 500 ml of dioxane, then a total of 187.2 g of 2,2,6,6-tetramethyl-4-aminopyridine is added dropwise while stirring, whereby dioxane (2000 ml in all) is constantly added to allow the reaction mixture to remain stirrable. The temperature of the reaction mixture is not allowed to exceed 30° C. The reaction mixture is subsequently boiled for 48 hours with reflux cooling, the residue is filtered, washed with acetone, dissolved in approx. 1000 ml of water, precipitated again with soda solution (pH 10–11), filtered, and the residue washed with water and vacuum-dried, yielding 89.2 g (72%) of a white powder having a melting point of >320° C. Isophthalic acid, or terephthalic acid likewise can be substituted in the above, and under suitable conditions the corresponding acid amides can be made, e.g. 1,3- or 1,4-di-(2',2',6',6'-tetramethylpiperidyl-4')-phthalic acid amide.

In like manner the reaction above can be made substituting 2,2,6,6-tetramethyl-4-aminopiperidine with 2,2,6,6-tetramethyl piperizine, and likewise the N-substituted hindered amines, substituted with following N-substituents may be used: $C_1$–$C_{18}$ alkyl, O, OH, $CH_2CN$, $C_1$–$C_{18}$alkoxy, alkoxyalkylenoxyalky, $C_5$–$C_{12}$cycloalkoxy, $C_3$–$C_6$alkenyl, $C_7$–$C_9$ phenylalkyl unsubstituted or mono-, di- or tri-substituted on the phenyl by $C_1$–$C_4$alkyl; or aliphatic or aromatic $C_1$–$C_{10}$ acyl groups.

The synthetic polyesters stabilized according to the invention can be prepared by conventional means, where a compound according to (A) is incorporated prior to, during, or after esterification or polycondensation polymerization of the resin. The preferred method of incorporating (A) is by mixing with commercially available polyester in the molten state. While the molten synthetic polyester is in a suitable receptacle, for example in an extruder, (A) is introduced into the receptacle and is worked into the resin to give a uniform dispersion prior to molding, extruding or spinning.

An effective amount of (A) ranges from 0.2 to 2.0% by weight of (A) based on the weight of synthetic polyesters to which (A) is added. Surprising effects are seen at a level of 0.3% to 1.0% by weight of the most preferred compound (2) (see (1) below) especially.

Synthetic polyester having incorporated the above mentioned effective amount of additive (1) resulted in surprising improvement in heat-stability, light stability, chemical stability and dye affinity of the polyester polymer as well as the stability and the light resistance of the coloring agent in the dyed or pigmented polyester as compared to the state of the art, without affecting certain desirable physical characteristics of the polymer, for example the relative viscosity and the degree of polymerization. Furthermore, the synthetic polyester exhibits a decreased tendency to yellow and exhibited unexpected improved unaged and aged stretchability and tensile strength.

If dyestuffs or pigments are employed in the synthetic polyesters they are preferably employed in amounts generally ranging from 0.1 to 10 wt. parts, more preferably, 0.1 to 4 wt. parts per 100 wt. parts of the synthetic polyester. Reactive dyes are used to dye synthetic polyesters according to the invention, in general between 0.05 and 5% by weight of the reactive dyes are used based on the weight of modified polyester. More preferably the amount of reactive dye used is from 0.1 to 3% by weight. The dyeings so obtained are also deeper than exhaust dyeings made with the same amount of dye on polyester of the state of the art.

b) Production of Polyester Spun Fiber Which is Dyed 100 parts of polyester in powder form are mixed with 1.0 parts of the compound (1) in a drum mixer. After a short time, the powder is dispersed very evenly. After ca. 10 minutes, the mixture is dried for 16 hours at 120°, added to a melt spinning machine, and after leaving for 8 minutes at 275–280° under a nitrogen atmosphere, is spun into fibers.

The fibers are dyed conventionally by exhaustion with 0.5% with the dyestuff C.I. Acid Red 216.

Very evenly red-dyed fibers are obtained having excellent brilliance, with very good washing, light and rubbing fastness properties. Polyester fibers modified according to the state of the art dyed in the same way have less depth of color and brilliance.

Instead of C.I. Acid Red 216, an appropriate amount of one of the following dyestuffs can also be used and are a few of the many example dyes suitable:

C.I. Acid Blue 80,
C.I. Acid Yellow 155, and yellow 147
C.I. Acid Violet 66,
C.I. Acid Blue 230
C.I. Acid Red 151, and Red 144
C.I. Acid Blue 260
C.I. Acid Orange 169
C.I. Acid Green and
C.I. Acid Red 119.

In a method analogous to the above example, an effective amount of Compounds (2) to (4) defined above can be worked into polyesters in like manner, spun into fibers and dyed with one of the acid dyes described above.

Synthetic polyester according to the invention can additionally comprise fillers or fibers, for example glass spheres or glass fibers, and/or delusterants, for example titanium dioxide contained at about 0.1 to 5.0 parts, more typically 0.2 to 2.0 parts per 100 parts of polyester.

UV absorbing stablilzers can be included. UV absorbers include, for example, the class of benzotriazoles, oxanilides, hydroxy substituted benzophenones, triazines, p-methoxy benzylidene malonate esters, including reaction products of p-methoxy benzylidene malonate hindered amino (such as PR-31 from Clariant).

The benzotriazoles include 2-(2'-hydroxphenyl) benzotriazoles, for example, 2-(2'-hydroxy-5'-methylphenyl)benzotriazole, 2-(3',5'-di-tert-butyl-2'-hydroxyphenyl)benzotriazole, 2-(5'-tert-butyl-2'-bydroxyphenyl)benzotriazole,2-[2'-hydroxy-5'-(1,1,3,3-tetramethylbutyl)phenyl]benzotriazole, 2-(3'-5'-di-tert-butyl-2'-hydroxyhenyl)-5-chlorobenzotriazole, 2-(3'tert-butyl-2'-hydroxy-5'-methylphenyl)-5-chlorobenzotriazole, 2-(3'-sec-butyl-5'-tert-butyl-2'-hydroxyphenyl) benzotriazole, 2-(2'-hydroxy-4'-octoxyphenyl) benzotriazole, 2-(3',5'-di-tert-amyl-2'-hydroxy-phenyl) benzotriazole, 2-(3',5'-bis(-dimethylbenzyl)-2'hydroxyphenyl)benzotriazole; mixture of 2-(3'-tert-butyl-2'-hydroxy-5'-(2-octyloxycarbonylethyl)phenyl)-5-chlorobenzotriazole, 2-(3'-tert-butyl-5'-[2-(2-ethyl-hexyloxy)carbonylethyl]-2'-hydroxyphenyl)-5-chlorobenzo-triazole, 2-(3'-tert-butyl-2'-hydroxy-5'-(2-methyxycarbonylethyl)phenyl)-5-chlorobenzotriazole, 2-(3'-tert-butyl-2'-hydroxy-5'-(2-methoxycarbonylethyl) phenyl)benzo-triazole, 2-(3'-tert-butyl-2'-hydroxy-(2-octyloxy-carbonylethyl)phenyl)benzotriazole, 2-(3'-tert-butyl-5'-[2-(2-ethylhexyloxy)carbonylethyl]-2'-hydroxyphenyl)-benzotriazole, 2-(3'-dodecyl-2'-hydroxy-5'-methylphenyl)-benzotriazole, and 2-(3'-tert-butyl-2'-hydroxy-5'-(2-isooctylocycarbonylethyl) phenylbenzotriazole, 2,2'-methylenebis[4-(1,1,3,3-tetramethylbutyl)-6-benzotriazol-2-ylphenol]; transesterification product of 2-[3'-tert-butyl-5'(2-methoxycarbonylethyl)-2'-hydroxyphenyl]benzo-triazole with polyethylene glycol 300; [R—CH$_2$CH$_2$—COO(CH$_2$) $_3$]$_2$ where R=3'-tert-butyl-4'-hydroxy-5'-2H-benzotriazol-2-ylphenyl; [R—CH$_2$CH$_2$—COO(CH$_2$CH$_2$O)$_{N/2}$]$_2$ where n=1 to 5 and R-3'-tet-butyl-4'-hydroxy-5'-2H-benzotriazol-2-ylphenyl.

A suitable commercially available benzotriazole is Norbloc® 7966, and 6000, from Jensen Pharma., Inc. Benzotriazoles are disclosed in U.S. Pat. Nos. 4,335,155, 4,405,749, and 4,528,311 which are incorporated herein by reference.

The triazines include, for example, 2-(2-hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2-(2,4-dihydroxyphenyl)-4,6-bis-(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis(4-methylphenyl)-1,3,5-triazine, 2-(2-hydroxy-4-dodecycloxyphenyl)-4,6-bis(2,4-dimethylphenyl)- 1,3,5-triazine, 2-[2-hydroxy-4-(2-hydroxy-3-butyloxypropyloxy) phenyl]-4,6-bis(2,4-dimethylphenyl)-1,3,5-triazine and 2-hydroxy-4-(2-hydroxy-3-octyloxypropyloxy)-phenyl]-4, 6-bis(2,4-dimethylphenyl)-1,3,5-triazine. A suitable commercially available triazine is CYASORB® 1164, from Cyanamid Corp.

Hindered benzoate UV absorbers include commercially available materials such as CYASORB® 2908 from Cyanamid, and FERRO® AM 340 from Ferro Corp.

A masterbatch composition may comprise in addition to the additive according to the invention a coloring agent. In this case such compositions comprise 2.5 to 40% by weight, preferably 5 to 25% by weight of the compound of formula (A), 5 to 40% by weight, preferably 7.5 to 20% by weight of a suitable dye or pigment and 95 to 50% by weight, preferably 85 to 60% by weight of polyester carrier polymer or a polymer dispersible in polyester, as conventionally employed in the art.

The following examples which are illustrative of the invention.

In the following examples all parts and percentages are by weight and all temperatures are given in degrees Celsius.

EXAMPLES

I. Production of polyester yarn

Polyester chips are dried in a vacuum tumble drier for 8 hours at a temperature of 110° or 125°. 2 kg batches of the dried polymer are combined and blended an appropriate amount of any compound according to formula (2) pre-dried to from 0.1% to 1.0% mixtures in polyester. Filament yarns are melt-spun from the mixtures under typical processing temperatures of above 260°, preferably 290° C. using the following equipment: An extruder fitted with one dynamic mixer at the top of the 30 mm-screw and two static mixers before the spinning head. For winding of the filament yarns consisting of 120 filaments, a BARMAG SW46 winder is used together with two godets. The as-spun yarns are optionally drawn subsequently using, for example a DIENES® draw-twisting machine.

II. Comparative data

The following additive compounds were employed for comparisons in spun PET fibers dyed with C.I. PIGMENT YELLOW 147 (PY-147, Table 1) and C.I. PIGMENT RED 144 (Table 2):

PS-1 a sterically hindered phosphonite processing stabilizer commercially available as Sandostab® P-EPQ ™ from Clariant.

Compound (11) commercially available as S-EED® from Clariant:

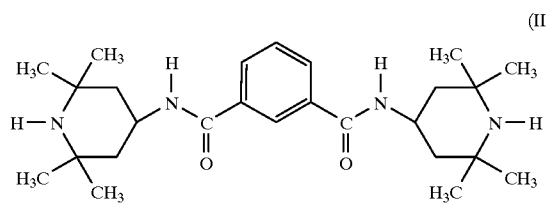

(II)

HALS-2 high MW tertiary hindered amine used for PET—Chimmasorb® 119

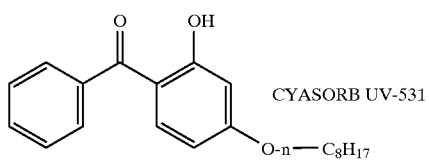
UVA-1
CYASORB UV-531

The following physical testing methods were applied to polyester fibers, which were spun in a commercial scale production facility. The yarns contained dyes, which are known to adversely affect the physical properties of the fiber after exposure to UV irradiation.

TENSILE STRENGTH—ASTM D2256 Standard Test method for Tensile Properties of Yarns by the single-strand Method (option 1, conditioned specimen, using Instron® CRE tester and 20 pound load cell, at an extension rate of 12 inches per minute, and a 10-inch gauge length, and the yarn contained 120 filaments per bundle UV EXPOSURE—in accordance with AATCC Test Method 16, option E, water-colored Xenon-Arc Lamp, Continuous Light, irradiance level of $1.10 W/m^2$ using 420 nm filters, 63° black body temperature, and 30% relative humidity.

GRAY SCALE—The AATCC Evaluation Procedure 1, for Gray Scale for Color Changes was utilized to detect shade differences in the polyester yarns. See Revisions May, 1, 1982 in the AATCC Technical Manual. The degree of alteration in Lightness, Hue and chroma of color in grades 1–5 are: Grade 5—negligible or no change; 4=slightly changed; 3=noticeably changed; 2=considerably changed;

and 1—much changed.

| Yarn contents | Initial | | 200 AFU Exposure | |
|---|---|---|---|---|
| | Tensile | % Elongation | Tensile | % Elongation |
| 0.1% PY 147 | 16.6 | 78.8 | 10.7 | 52.0 |
| 0.1% PY 147 | 16.9 | 80.9 | 8.4 | 34.7 |
| 0.1% PY 147 + 0.1% SEED | 14.3 | 73.0 | 11.5 | 58.0 |
| 0.1% PY 147 + 0.1% SEED | 16.2 | 77.0 | 15.2 | 70.6 |

Additional spun PET yarns were prepared and exposed according to AATCC Test method 16 with the following physical properties obtained:

TABLE 1

| Test | Colorant (%) | Additive % | GRAY (200 hr) | GRAY (300 hr) |
|---|---|---|---|---|
| 1y | 0.1% Yellow 147 | None-control | 3–4 | 3 |
| 2y | 0.5% yellow 147 | None-control | 3–4 | 3 |
| 3y | 0.1% Yellow 147 | 0.1% UVA-1 | 3–4 | 3 |
| 4y | 0.5% yellow 147 | 0.5% UVA-1 | 4 | 3–4 |
| 5y | 0.1% Yellow 147 | 0.1% HALS-2 | 4 | 3–4 |
| 6y | 0.5% yellow 147 | 0.5% HALS-2 | 3–4 | 3–4 |
| 7y | 0.1% Yellow 147 | 0.1% (II) | 4 | 4 |
| 8y | 0.1% yellow 147 | 0.5% (II) | 4 | 4 |
| 9y | 0.1% Yellow 147 | 0.1% PS-1 | 3 | 2–3 |
| 10y | 0.5% yellow 147 | 0.5% PS-1 | 3 | 2–3 |
| 11y | 0.1% Yellow 147 | 0.1% PS1 + 0.1% (II) | 3–4 | 3 |
| 12y | 0.5% yellow 147 | 0.5% PS1 + 0.5% (II) | 3–4 | 3–4 |

TABLE 2

| Test | Colorant (%) | Additive % | GRAY (200 hr) | GRAY (300 hr) |
|---|---|---|---|---|
| 1r | 0.1% Red 144 | None-control | 4 | 3–4 |
| 2r | 0.5% Red 144 | None-control | 4 | 4 |
| 3r | 0.1% Red 144 | 0.1% UVA-1 | 4–5 | 4 |
| 4r | 0.5% Red 144 | 0.5% UVA-1 | 4 | 4 |
| 5r | 0.1% Red 144 | 0.1% HALS-2 | 4–5 | 4 |
| 6r | 0.5% Red 144 | 0.5% HALS-2 | 4–5 | 4 |
| 7r | 0.1% Red 144 | 0.1% (II) | 4 | 3–4 |
| 8r | 0.5% Red 144 | 0.5% (II) | 4–5 | 4 |
| 9r | 0.1% Red 144 | 0.1% PS-1 | 4 | 3–4 |
| 10r | 0.5% Red 144 | 0.5% PS-1 | 4–5 | 4 |
| 11r | 0.1% Red 144 | 0.1% PS-1 + 0.1% (II) | 4 | 3–4 |
| 12r | 0.5% Red 144 | 0.5% PS-1 + 0.5% (II) | 4 | 4 |

I claim:

1. A polyester polymer in intimate mixture of polyester with an effective amount of compound (A)

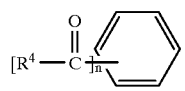

(A)

wherein n=2 or 3 and at least one $R^4$ group represents a sterically hindered amine group adjacent to the carbonyl, and said $R^4$ is selected from the group consisting of formulae (α)

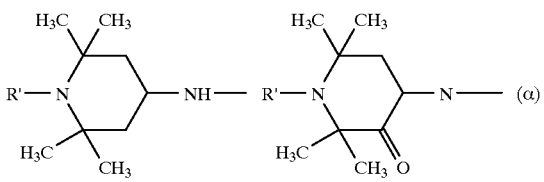

wherein for either α structure R' is hydrogen, $C_1$–$C_{18}$ alkyl, $C_1$–$C_{18}$ alkoxy or alkamino, $C_1$–$C_{18}$ alkylamino substituted by halogen, $C_1$–$C_{18}$ hydroxy, carboxyl groups, carbamyl groups, $C_1$–$C_{12}$ alkoxycarbonyl groups, $C_3$–$C_5$ alkenyloxy, unsubstituted benzyloxy, benzyloxy substituted by halogen or $C_1$–$C_5$alkyl, aliphatic acyloxy containing up to 18 carbon atoms, unsubstituted benzoyloxy, benzoyloxy substituted with halogen, and benzoyloxy substituted with $C_1$–$C_4$alkyl, —CO—$C_4$alkyl.

2. The polyester of claim I wherein (A) is selected from the group consisting of

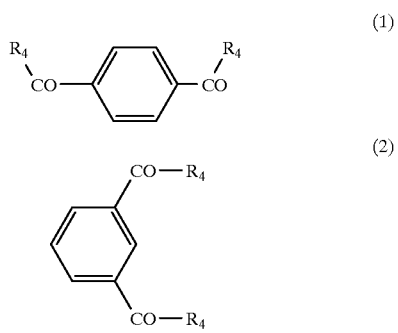

-continued (3) 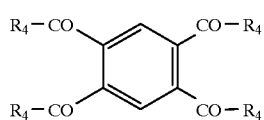

(4) 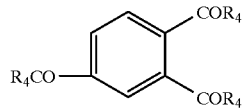

wherein R$_4$ is defined above as in claim 1.

3. The polyester of claim 1 wherein (A) is

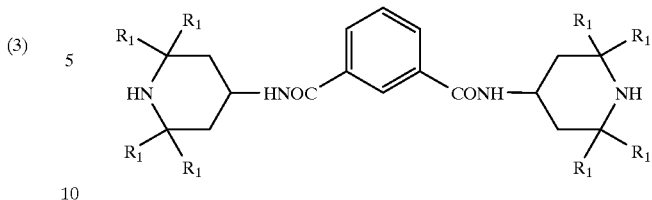

wherein R$_1$ represents a methyl group.

4. The polyester of claim 1 wherein (A) is present in an amount of from 0.1 to 5.0 parts by weight per 100 parts by weight of the said polyester.

5. A process of improving the coloring of synthetic polyesters in the mass by mixing together the polyester of claim 1, with a dyestuff or pigment.

6. A masterbatch composition comprising polyester, or a polymer carrier at least miscible with polyester and a compound of formula (A) as defined in claim 1.

7. The polyester of claim 1 in the form of a fiber.

* * * * *